United States Patent [19]

Ayres

[11] 3,897,340
[45] *July 29, 1975

[54] SERUM/PLASMA SEPARATOR ASSEMBLY WITH INTERFACE-SEEKING PISTON HAVING COARSE AND FINE BAND FILTERS

[75] Inventor: Waldemar A. Ayres, Rutherford, N.J.

[73] Assignee: Becton, Dickinson and Company, East Rutherford, N.J.

[ * ] Notice: The portion of the term of this patent subsequent to July 15, 1992, has been disclaimed.

[22] Filed: Feb. 27, 1974

[21] Appl. No.: 446,358

[52] U.S. Cl. ............... 210/314; 210/359; 210/516; 210/DIG. 23
[51] Int. Cl. ........................................ B01d 21/26
[58] Field of Search ....... 23/230 B, 258.5, 259, 292; 128/2 F, 214 R, 218 M, 272; 210/83, 84, 109, 131, 359, 514–518, DIG. 23, DIG. 24, 136, 314, 316; 233/1 A, 1 R, 26

[56] References Cited
UNITED STATES PATENTS

| | | | |
|---|---|---|---|
| 3,539,300 | 11/1970 | Stone | 210/DIG. 24 |
| 3,661,265 | 5/1972 | Greenspan | 210/359 |
| 3,741,400 | 6/1973 | Dick | 210/516 |
| 3,782,548 | 1/1974 | Bowen | 210/DIG. 23 |

Primary Examiner—John Adee
Assistant Examiner—Robert H. Spitzer
Attorney, Agent, or Firm—Kane, Dalsimer, Kane, Sullivan and Kurucz

[57] ABSTRACT

A blood collection and separator assembly of the type suitable for centrifuging to separate the plasma/serum or light phase from the cellular or heavy phase of blood is disclosed. The assembly includes a collection container and an interface-seeking piston having coarse and fine band filters. The piston is slidably disposed therein for sealing off the plasma/serum phase from the cellular phase of blood after centrifuging is terminated. The piston is formed having a specific gravity greater than the specific gravity of blood. A filter assembly is mounted in the form of bands on the piston which maintains a sliding seal between the outer surfaces of the filter assembly and the inner surface of the container as the piston moves downwardly into the container during centrifuging. The piston automatically stops at the plasma/serum-cellular interface by clogging the filter assembly with the cellular phase and forms a barrier between the plasma/serum phase and the cellular phase.

4 Claims, 3 Drawing Figures

SERUM/PLASMA SEPARATOR ASSEMBLY WITH INTERFACE-SEEKING PISTON HAVING COARSE AND FINE BAND FILTERS

BACKGROUND OF THE INVENTION

This invention relates generally to a plasma/serum separator assembly and particularly to a plasma/serum separator with an interface-seeking piston having coarse and fine band filters. When the assembly is centrifuged the piston will seek and automatically stop at the plasma/serum-cellular interface. The piston is stopped by utilizing a fine filter which is made of a resilient material and maintains a sliding seal between the filter and the container. When the piston contacts the interface the cellular phase clogs the fine filter thereby stopping the piston's downward movement at the interface and the piston reestablishes a seal in which the piston forms a barrier between the separated phases.

DESCRIPTION OF THE PRIOR ART

It is known to separate blood into its component parts by centrifugation, for example, the assembly disclosed in U.S. Pat. No. 2,460,641. However, this particular assembly does not employ a means for sealing the separated plasma or serum phase from the cellular phase.

It is also known to provide assemblies for manually separating the plasma or serum phase from the cellular phase, for example, as disclosed in U.S. Pat. Nos. 3,586,064; 3,661,265; 3,355,098; 3,481,477; 3,512,940 and 3,693,804. In all of these devices the serum is collected in a blood collection container and means are provided for separating the plasma or serum phase from the cellular phase employing filters, valves, transfer tubes or the like.

It is also known to provide assemblies for the sealed separation of blood in which a piston is actuated by centrifugal force such as is disclosed in U.S. Pats. Nos. 3,508,653 and 3,779,383. These devices use either a deformable piston made of a resilient material or valve means associated with the piston to affect a sealed separation after centrifugation.

SUMMARY OF THE INVENTION

It is an object of the present invention to provide a plasma/serum separator assembly in which an interface-seeking piston automatically stops, when centrifuged, at the plasma/serum cellular interface.

It is another object of the invention to provide a piston having deformable sealing rings that will not be accidentally opened when the container is being filled with blood by the pressure difference of blood at atmospheric pressure and the vacuum on the other side of the valve. It is also an object of the invention to provide a piston having a filter assembly which will prevent solid materials contained in the blood from passing into the separated plasma or serum phase.

It is another object of the invention to provide a plasma/serum separator assembly which is economical to manufacture and can be used in conjunction with standard blood collecting equipment.

My invention generally contemplates the provision of a separator assembly which includes a blood collection container for receiving blood, the container having at least one open end which is adapted to receive a closure for sealing the open end of the container. An interface-seeking piston is formed having a specific gravity greater than the specific gravity of blood and is slidably mounted in the container. The piston is provided with coarse and fine band filters disposed around its periphery which forms a sliding sealing fit with the container during centrifuging and any solid material contained in the plasma/serum phase is filtered therefrom. When the piston contacts the interface it automatically stops when the fine filter band becomes clogged with the cellular phase.

DESCRIPTION OF THE DRAWINGS

For a better understanding of the invention reference is had to the drawings which illustrate a preferred embodiment of the invention herein.

DESCRIPTION OF THE PREFERRED EMBODIMENTS

Figure 1:
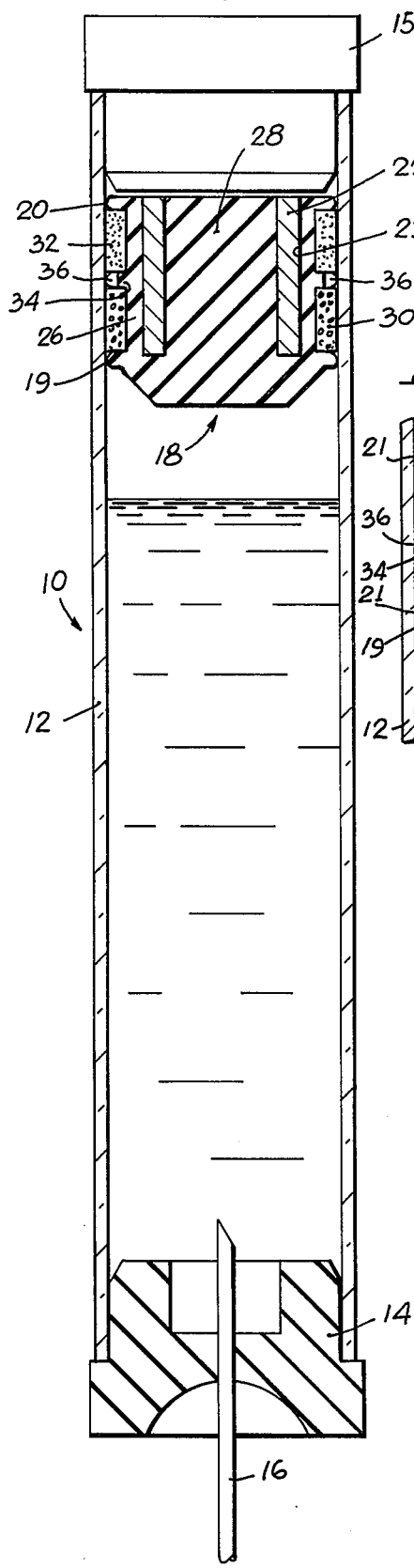
FIG. 1 is a sectional, elevational view of the plasma/serum separator assembly with an interface-seeking piston having coarse and fine band filters which illustrates a pointed cannula penetrating one of the stoppered ends of the container through which blood is introduced into the assembly prior to its separation.
Figure 3:
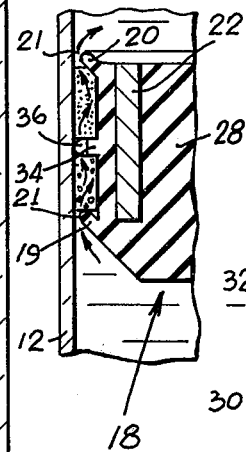
FIG. 3 is a fragmentary sectional view partly broken away which illustrates the piston as it moves downwardly in the container during centrifugation with the plasma/serum moving upwardly through the filters in the direction of the arrows.
Figure 2:
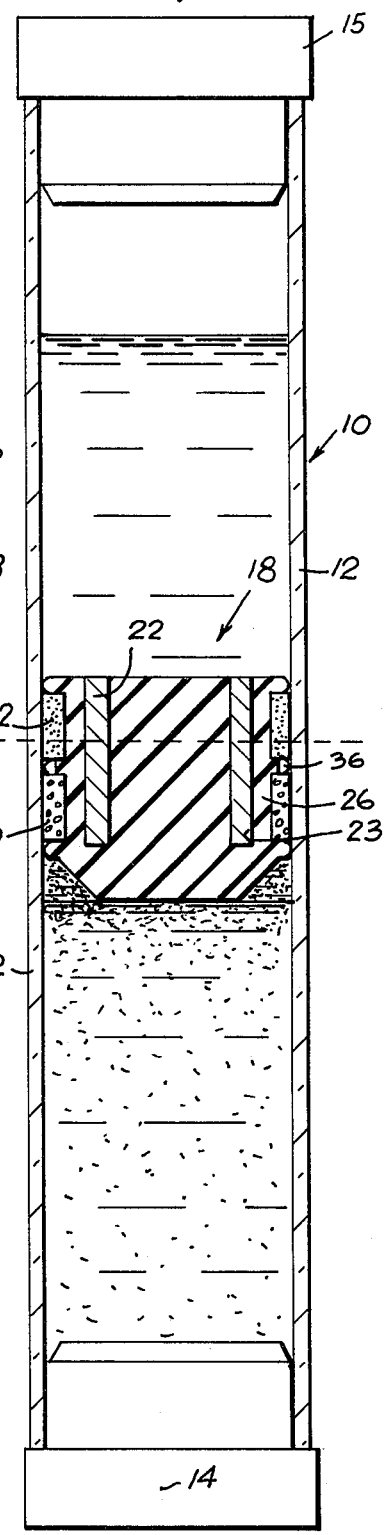
FIG. 2 is a sectional, elevational view partly broken away illustrating the position of the piston at the plasma/serumcellular interface after the assembly has been centrifuged.

For a better understanding of the invention herein a description of the preferred embodiment is had which is illustrated in FIGS. 1 through 3.

In FIG. 1 separator assembly 10 comprises a tubular member or container 12 which is sealed at its open ends by closure members 14 and 15. Closure members 14 and 15 are preferably made of rubber and are capable of being penetrated by a cannula 16 so that blood can be transferred from a blood source into the container under aseptic conditions. Closures 14 and 15 are preferably made of elastomeric material and should be self-sealing so that when the cannula is removed from closure 14 there will be no loss of blood passing through the penetration portion of closure 14. As depicted in FIG. 1, blood is being conducted through cannula 16 and is shown filling container 12 to about the point where piston 18 is positioned adjacent closure member 15. Thereafter, cannula 16 is removed and assembly 10 is ready for centrifuging for subsequent separation of the collected blood into the plasma or serum phase and the cellular phase. In this connection, seal rings 20 remain in sealing contact with the inner wall surfaces of container 12 while blood is filling the container and will not be accidentally opened by the pressure differential between blood at atmospheric pressure and the vacuum that is present in filters 30 and 32. Seal rings 19 and 20 perform a valve-like function which permits separated plasma/serum to deform the seal rings due to the hydrostatic pressure exerted by descent of the piston during centrifuging as seen most clearly in FIG. 3. As noted by the direction of the arrows in FIG. 3, openings 21 are formed between seal rings 19 and 20 and the inner wall of the container 12 to form a pathway for the plasma/serum to pass around the piston and through band filters 30, 32 during centrifuging.

Disposed in container 12 is piston 18 which includes a tubular metal insert 22 which is mounted in the annular recess 23 of piston 18. Metal insert 22 is preferably made of stainless steel or other rigid chemically inert material having a specific gravity substantially greater than blood. The body of piston 18 is preferably formed of elastomeric material and is provided with annular recess 23 which is dimensioned to receive tubular member 22 in an interference fit so that no air space remains in annular recess 23.

The elastomeric portion of piston 18 comprises an outer wall 26 and spaced therefrom is inner body portion 28 in which their respective wall surfaces define annular recess 23. Formed integrally with wall 26 are axially spaced resilient deformable sealing rings 19 and 20 which contact the inner wall surface of container 12 in sealing liquid tight engagement when not subject to centrifugal force. However, when piston 18 is subjected to centrifugal force piston 18 descends and seal rings 19 and 20 are forced open by hydrostatic pressure and no longer maintain sealing contact with the inner wall of container 12 throughout the path of travel of piston 18 within the container but it provides a pathway for plasma/serum to be conducted around piston 18 through filters 30, 32.

Filter 30 is a coarse filter which will permit the cellular phase to pass therethrough but will remove from the separated plasma/serum any fibrin strands or other similar materials in the light phase. Filter 30 may be made of types of filter media such as felt, cellulose fiber in the form of a mat, foam material of the open cell type having interconnecting passages, etc. Filter 30 is disposed around piston 18 adjacent seal ring 19 and forms a sliding sealing fit with the inner wall surface of container 12.

Fine filter 32 is disposed adjacent sealing ring 20 and similarly forms a sliding sealing fit with the inner surface of container 12. Filters 30, 32 are separated by a radially extending ring 34 having a plurality of spaced notches 36 to provide communicating passages between filter 30 and filter 32.

Coarse filter 30 has an average pore size greater than the cellular phase of blood and serves as a prefilter to take out larger particles such as fibrin strands or clots from the plasma or serum before it reaches fine filter 32.

When using the assembly illustrated in FIGS. 1 through 3 blood is collected in assembly 10, cannula 16 is removed from closure 14 and assembly 10 is placed in a centrifuge for subsequent separation. Initially, assembly 10 is subjected to a spin speed which is suitable to cause the heavy or cellular phase material to pass downwardly in the container toward stopper 14 but is insufficient to cause piston 18 to start its downward movement in container 12. Then, the assembly is subjected to a higher spin speed which causes deformable seal rings 19, 20 to break their seal with the inner wall surface of container 12 to form openings 21 around piston 18 so that separated plasma/serum may pass upwardly around piston 18 through coarse filter 30, through connecting passage 36 of ring 34 and through fine filter 32. As noted, the hydrostatic pressure created by centrifuging assembly 10 causes seal rings 19, 20 to become deformed upwardly as seen in FIG. 3 to permit filtered plasma/serum to flow above piston 18 as piston 18 moves downwardly in container 12 towards the plasma/serum-cellular interface.

When piston 18 reaches the plasma/serum-cellular interface as illustrated in FIG. 2, red cells and other heavy portions of the cellular phase pass through coarse filter 30 and are stopped by fine filter 32 thereby causing filter 32 to become clogged and effectively stop piston 18 at the plasma/serum-cellular interface as illustrated by the dotted line in FIG. 2. Thereafter, even though centrifuging continues seal rings 19, 20 return to their normal position as in FIG. 1. When centrifuging is completed the piston is established as a sealed barrier at the interface between the serum/plasma phase and the cellular phase.

From the foregoing, it is readily observed that a plasma/serum separator assembly in which an interface-seeking piston with a centrifugal valve is disclosed the assembly is described in which blood can be collected, centrifuged, separated into its component phases and is capable of being shipped through the mail for further analytical determinations without the plasma or serum mixing with the cellular phase even though the assembly is inverted and handled roughly.

While variations of the invention herein may be had the objectives of the invention have been illustrated and described and it is contemplated that changes in design can be made without departing from the spirit of the invention described herein.

What is claimed is:

1. A separator assembly capable of separating blood into a plasma/serum or light phase and a cellular or heavy phase comprising:
   a container having at least one open end which is adapted to receive blood for subsequent separation into a light phase and a heavy phase;
   a closure sealing the open end of the container, the closure being formed of a self-sealing, elastomeric material which is penetrable by a cannula through which blood to be separated is conducted into the container;
   an interface-seeking piston having a specific gravity greater than blood and slidably mounted in the container and having means on an outer surface for providing sealing engagement with an inner surface of the container;
   said means including at least two radially extending deformable seal rings mounted on the piston and disposed at the lower and upper ends thereof and a notched radially extending ring disposed between said upper and lower seal rings;
   said seal rings being capable of being deformed to open a path around said piston when said assembly is subjected to centrifugal force;
   a filter assembly mounted on said piston and positioned between said upper and lower seal rings and being in slidably sealing engagement with the inner surface of the container so that separated plasma/serum is filtered when said assembly is centrifuged;
   said filter assembly including a first filter element located adjacent to said upper seal ring and having an average pore size smaller than said heavy phase; and a second filter element located adjacent to said lower seal ring and having an average pore size greater than said heavy phase; and
   said filter assembly providing piston stop means when said piston is at the plasma/serum-cellular interface whereby the cellular phase clogs said first filter element prevent the upward flow of plasma/serum therethrough so that the piston automatically stops at said interface.

2. The separator assembly of claim 1 wherein said notched ring is positioned between said coarse and fine filter elements.

3. An interface-seeking piston adapted for use for separating the serum or plasma phase from the cellular phase of blood in a separator assembly including a container, said piston having a specific gravity relatively greater than blood and adapted to be slidably mounted in the container and having means on an outer surface for providing sealing engagement with an inner surface of the container;

said means including at least two radially extending deformable seal rings mounted on the piston and disposed at the lower and upper ends therof and a notched radially extending ring disposed between said upper and lower seal rings;

said seal rings being capable of being deformed to open a path around said piston when said assembly is subjected to centrifugal force;

a filter assembly mounted on said piston and positioned between said upper and lower seal rings and being adapted for slidably sealing engagement with the inner surface of the container so that separated plasma/serum is filtered when said assembly is centrifuged;

said filter assembly including a first filter element located adjacent to said upper seal ring and having an average pore size smaller than said cellular phase; and a second filter element located adjacent to said lower seal ring and having an average pore size greater than said cellular phase said filter assembly being adapted to provide piston stop means when said piston is at the plasma/serum-cellular interface.

4. The piston of claim 3 wherein said notched ring is positioned between said first and second filter elements.

* * * * *